United States Patent
Xiao

(10) Patent No.: US 8,313,142 B2
(45) Date of Patent: Nov. 20, 2012

(54) CHILD SAFETY SEAT ASSEMBLY

(75) Inventor: Xiao-Hong Xiao, Central Hong Kong (HK)

(73) Assignee: Wonderland Nurserygoods Company Limited, Central Hong Kong (HK)

( * ) Notice: Subject to any disclaimer, the term of this patent is extended or adjusted under 35 U.S.C. 154(b) by 160 days.

(21) Appl. No.: 12/860,235

(22) Filed: Aug. 20, 2010

(65) Prior Publication Data

US 2011/0057490 A1 Mar. 10, 2011

(51) Int. Cl.
*A47C 1/08* (2006.01)
(52) U.S. Cl. ......... 297/256.16; 297/256.13; 297/256.14; 297/250.1; 297/254; 297/256.1
(58) Field of Classification Search ............. 297/256.16, 297/256.13, 256.14, 250.1, 254, 256.1
See application file for complete search history.

(56) References Cited

U.S. PATENT DOCUMENTS

| | | | |
|---|---|---|---|
| 5,335,964 A | 8/1994 | Sedlack et al. | |
| 6,139,101 A * | 10/2000 | Berringer et al. | 297/256.1 |
| 6,428,099 B1 * | 8/2002 | Kain | 297/256.1 |
| 6,554,358 B2 * | 4/2003 | Kain | 297/256.13 |
| 6,592,183 B2 * | 7/2003 | Kain | 297/253 |
| 6,764,135 B2 * | 7/2004 | Sasaki et al. | 297/256.16 |
| 7,461,893 B2 * | 12/2008 | Maciejczyk | 297/216.11 |

FOREIGN PATENT DOCUMENTS

| | | |
|---|---|---|
| CN | 2767245 Y | 3/2006 |
| EP | 0431198 A1 | 6/1991 |
| EP | 0732235 A3 | 5/1997 |

* cited by examiner

*Primary Examiner* — Laurie Cranmer
(74) *Attorney, Agent, or Firm* — Baker & McKenzie LLP; David I. Roche

(57) ABSTRACT

A child safety seat assembly comprises a base including a plurality of protruding sidewalls, and a seat movably assembled with the base including a plurality of anchoring slots adapted to retain a portion of a safety belt, wherein seat is movably adjustable between an erected position and a reclined position relative to the base. Some of the anchoring slots can be selectively obstructed by the sidewalls of the base when the seat is adjusted to a different inclination relative to the base. As a result, erroneous operations for securing the seat assembly with a safety belt can be prevented, and the seat assembly can be safer in use.

20 Claims, 5 Drawing Sheets

CHILD SAFETY SEAT ASSEMBLY

CROSS-REFERENCE TO RELATED APPLICATION

This application claims priority of Chinese application no. 200910168797.5 filed on Sep. 4, 2009.

BACKGROUND OF THE INVENTION

1. Field of the Invention

The present invention relates to a child safety seat assembly, and more particularly to a child safety seat assembly that can be adjustable between a vertically erected position and a reclined position.

2. Description of the Related Art

Utility Model Patent No. CN2767245, the disclosure of which is incorporated herein by reference, describes a child safety seat assembly that includes a base and a seat having a backrest. For securing the seat assembly in a vehicle, the seat assembly includes a plurality of lower slots provided at two sides of the base, and upper slots located on an upper rear region of the backrest at left and right sides. While the seat assembly is placed in a rearward position (i.e., where the rear of the seat is oriented toward the front of the vehicle), the safety belt of the vehicle can be held in the aforementioned lower and upper slots for securely restraining the seat assembly. However, the above construction is adapted to secure the seat assembly in only one fixed configuration, and cannot restrain the seat assembly if it is placed in a different position.

Therefore, there is a need for an adjustable child safety seat assembly that can be manufactured in a cost-effective manner, and address at least the foregoing issues.

SUMMARY

The present application describes a child safety seat assembly. In one embodiment, the child safety seat assembly comprises a base including a plurality of protruding sidewalls, and a seat movably assembled with the base including a plurality of anchoring slots adapted to retain a portion of a safety belt of a vehicle, wherein the seat is movably adjustable between an erected position and a reclined position relative to the base. According to certain embodiment, some of the anchoring slots can be selectively obstructed by the sidewalls of the base when the seat is adjusted relative to the base. As a result, erroneous operations for securing the seat assembly with a safety belt can be prevented, and the seat assembly can be safer in use.

DETAILED DESCRIPTION OF THE EMBODIMENTS

Figure 1:
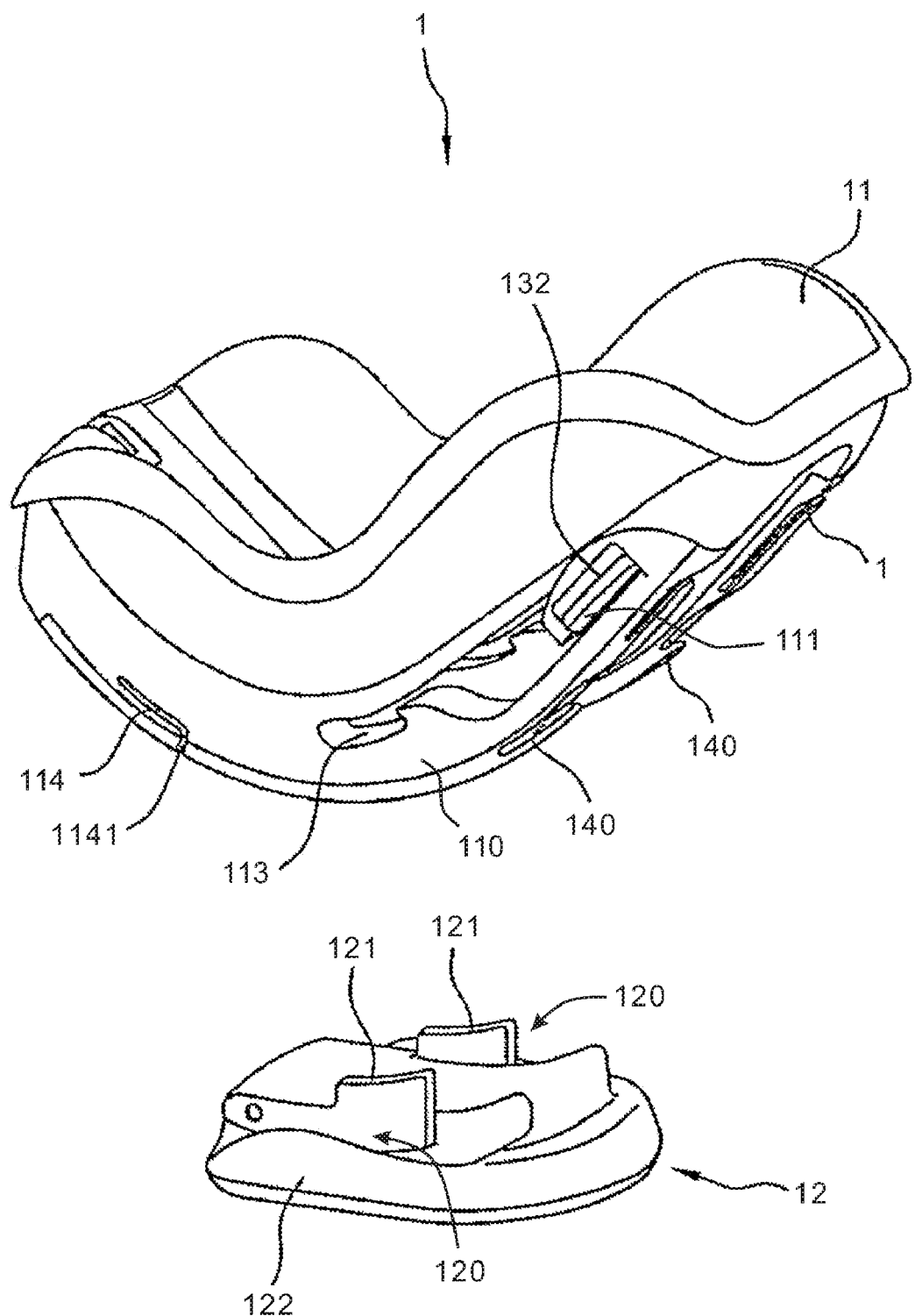
FIG. 1 is an exploded view illustrating one embodiment of a child safety seat assembly.
Figure 6:
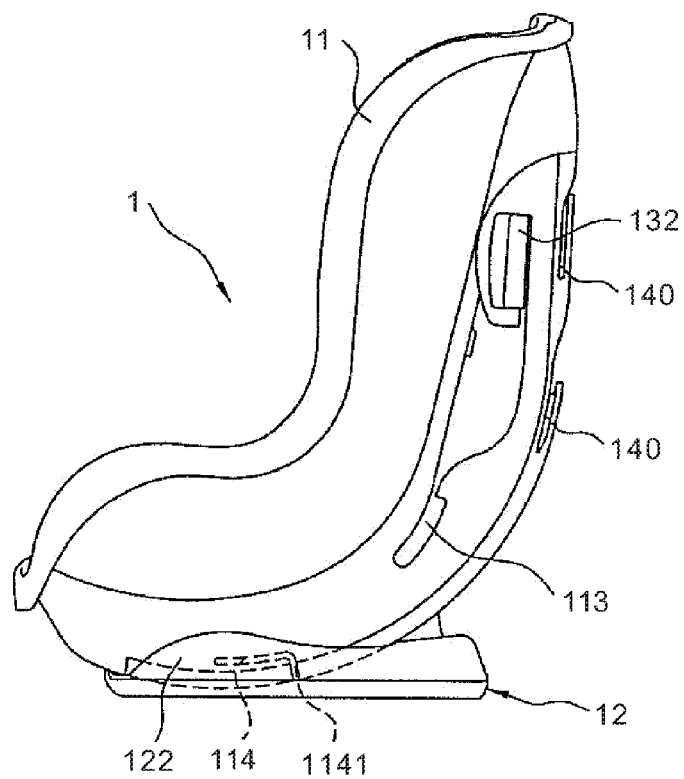
FIG. 6 is a left side view illustrating the child safety seat assembly in a vertically erected position relative to the base.
Figure 7:
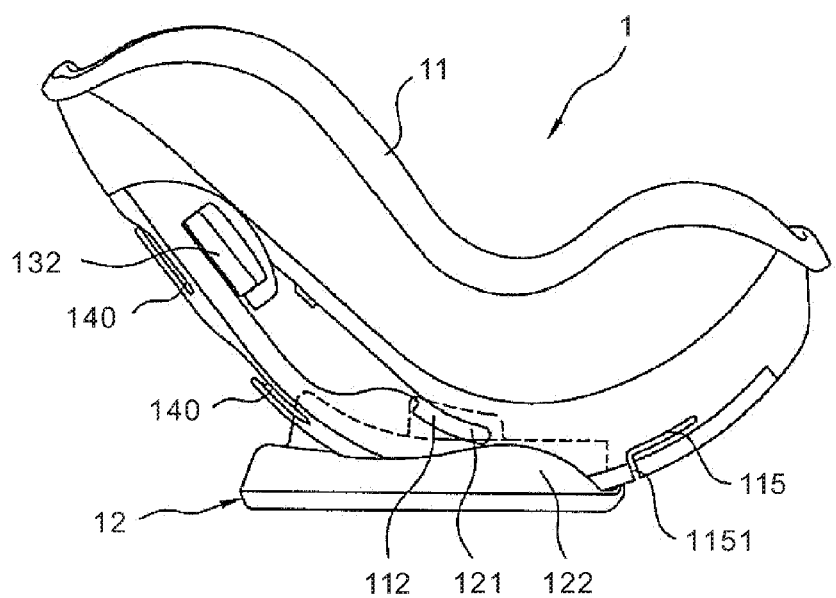
FIG. 7 is a right side view illustrating the child safety seat assembly in a reclined position relative to the base.

Reference is made to FIGS. 1, 6 and 7 to describe one embodiment of a child safety seat assembly 1. More specifically, FIG. 1 is an exploded view of the child safety seat assembly 1, and FIGS. 6 and 7 are left and right side views illustrating the child safety seat assembly 1 at different inclinations. The child safety seat assembly 1 comprises a seat 11 and a base 12. The seat 11 and the base 12 can be configured as two parts that are permanently joined with each other. The seat 11 may be formed as a rigid shell comprising a seating portion, and a backrest connected at a rear of the seating portion. The backrest of the seat 11 can comprise two protruding rail portions 110 that are disposed symmetrical on left and right sides. The rail portions 110 can have a curved or arc shape and are disposed parallel to each other along a rear of the backrest to a bottom of the seat 11.

As shown, each of the rail portions 110 includes a first anchoring slot 111 that is arranged symmetrical at an upper side of each rail portion 10, corresponding to an upper side of the backrest. The first anchoring slots 111 extend in a transversal direction through each rail portion 110 from left to right. In addition, each first anchoring slot 111 can also be provided with a spring-driven clipper 132. Either of the two clippers 132 may be operable to clip and hold a portion of a safety belt passed through the corresponding first anchoring slot 111 (as better shown in FIG. 2).

The two rail portions 110 also respectively include a plurality of second anchoring slots 112 and 113 (e.g., second anchoring slot 112 for the right rail portion 110 as better shown in FIG. 7, and second anchoring slot 113 for the left rail portion 110 as better shown in FIG. 1) disposed below the first anchoring slots 111 and at a lower side of the backrest. Like the first anchoring slots 111, the second anchoring slots 112 and 113 are disposed at symmetrical positions on the two rail portions 110, and also extend from left to right in a transversal direction through each rail portion 110. In one embodiment, the second anchoring slots 112 and 113 may be entirely closed on the rear surface of the rail portions 110, such that a safety belt can be inserted through the second anchoring slots 112 and 113 of the rail portions 110 only in a transversal direction (i.e., from left to right or reversely).

Referring again to FIGS. 1, 6 and 7, the bottom portions of the two rail portions 110 corresponding to a bottom of the seat 11 also respectively include a plurality of third anchoring slots 114 and 115 (e.g., third anchoring slot 114 for the left rail portion 110 as better shown in FIG. 1, and third anchoring slot 115 for the right rail portion 110 as better shown in FIG. 7). Like the first anchoring slots 111 and second anchoring slots 112 and 113, the third anchoring slots 114 and 115 are disposed at symmetrical positions on the two rail portions 110, and also extend from left to right in a transversal direction through each rail portion 110. In addition, the third anchoring slots 114 and 115 also respectively include openings 1141 and 1151 through which a portion of a safety belt 31 can be inserted from a bottom of the seat 11 into the third anchoring slots 114 and 115 (as better shown in FIGS. 4 and 5).

Figure 8:
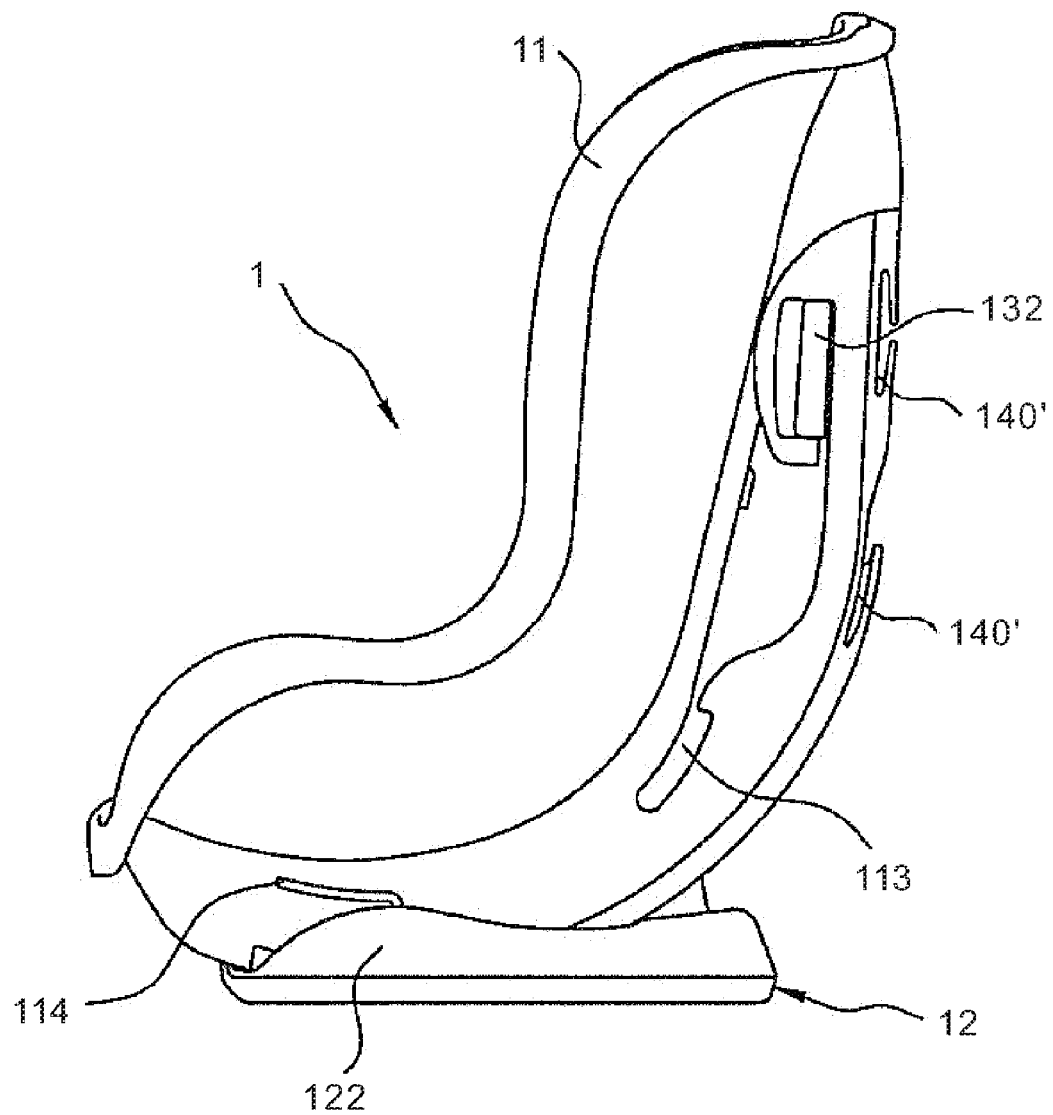
FIG. 8 is a schematic view illustrating another embodiment of the child safety seat assembly.

Aside the aforementioned anchoring slots, the two rail portions 110 also include a plurality of anchoring pockets 140. The anchoring pockets 140 are opened on the rear surface of each rail portion 110 such that a portion of the safety belt 31 can be inserted from the rear of the backrest into the anchoring pockets 140 (as better shown in FIGS. 4 and 5). In one embodiment, two anchoring pockets 140 can be provided in each rail portion 110, one above the other at positions approximately aligned horizontally with the first anchoring slot 111 and second anchoring slots 112/113, the anchoring pockets 140 being opened toward the rear of the backrest. It is worth noting that the anchoring pockets can be formed with any shape. FIGS. 1 and 6 illustrate one embodiment in which each anchoring pocket 140 is half open on the upper side. FIG. 8 illustrates another embodiment in which each anchoring pocket 140' is substantially enclosed in the rail portion 110 and is opened on the rear surface of the rail portion 110 via a narrow slit.

Figure 2:
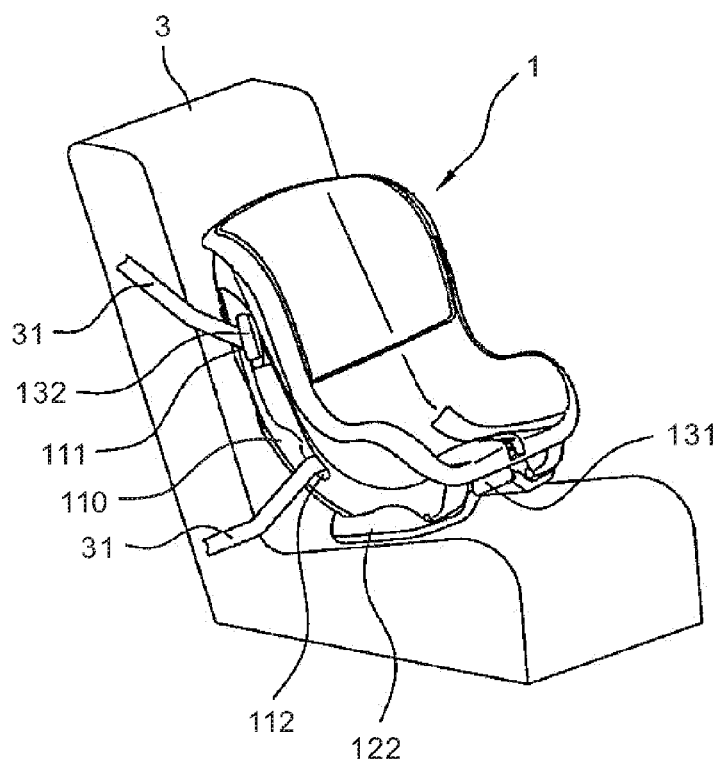
FIGS. 2 and 3 are schematic views illustrating the child safety seat assembly of FIG. 1 used on a vehicle seat in a forward position.
Figure 3:
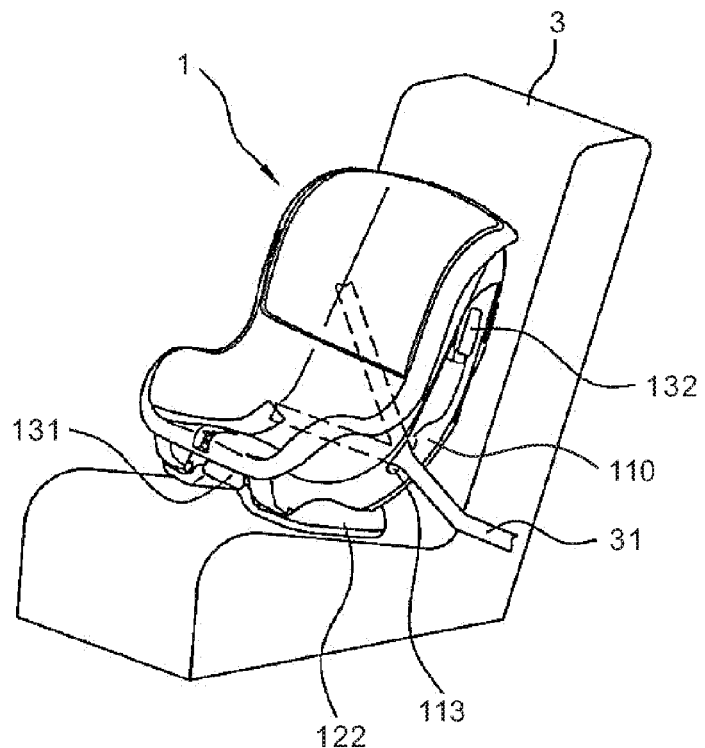

Referring again to FIGS. 1, 6 and 7, the base 12 is permanently assembled with the seat 11. More specifically, the base 12 comprises two recessed portions 120 into which the rail portions 110 can be movably placed. Each recessed portion 120 is delimited between two protruding sidewalls 121 and 122. As shown, each of the sidewalls 121 is located at an inner side of the corresponding recessed portion 120 (i.e., closer to a central area of the base 12), whereas the sidewall 122 is located at an outer side of the corresponding recessed portion 120 (i.e., farther from the central area of the base 12). As shown, the sidewalls 121 and 122 can extend with different heights. In one embodiment, the sidewalls 121 at the inner sides of the recessed portions 120 can protrude higher than the sidewalls 122 at the outer sides of the recessed portions 120. Moreover, the higher portions of the sidewalls 121 can be located at positions offset rearward from the sidewalls 122, such that the sidewalls 121 and 122 are misaligned from each other in a transversal direction (e.g., the sidewalls 122 are closer to the front of the base 12 than the sidewalls 121). As the seat 11 is adjusted relative to the base 12 for modifying the inclination of the seat 11, the rail portions 110 can move inside the recessed portions 120, and either of the sidewalls 121 and 122 can selectively obstruct some of the aforementioned anchoring slots for preventing erroneous insertion of the vehicle safety belt (as described in detail hereafter). In addition, a latching mechanism (not shown) may also be provided between the seat 11 and the base 12 for locking the seat 11 in position once the seat 11 has been adjusted to the desired inclination. As schematically shown in FIGS. 2 and 3, the latching mechanism may comprise an operating handle 131 provided at a front of the seat 11. The operating handle 131 can be manipulated for unlocking the position of the seat 11 relative to the base 12, for example. After it is unlocked, the seat 11 can be adjusted forward or backward to adjust the inclination of the seat 11 relative to the base 12. It is worth noting that the operating handle 131 can also be provided at a front of the base 12 to allow convenient manipulation of the latching mechanism by a user.

According to one embodiment, the seat 11 can be adjusted between at least a vertically erected position and a reclined position relative to the base 12 in use. FIGS. 2 and 3 are schematic views illustrating one embodiment in which the child safety seat assembly 1 is used on a vehicle seat 3 in a forward position (i.e., the front of the seat 11 is oriented toward the front of the vehicle). In this configuration, the seat 11 is in a vertically erected position relative to the base 12. For securing the child safety seat assembly 1 on the vehicle seat 3, one portion of the safety belt 31 (e.g., shoulder strap) passes from right to left (or reversely) through the first anchoring slot 111 of one rail portion 110 and is held by the clipper 132. Meanwhile, another portion of the safety belt 31 (e.g., lap strap) passes from right to left (or reversely) through and is retained in the second anchoring slots 112 and 113 of the two rail portions 110 below the first anchoring slots 111. As better shown in FIG. 6, in this erected position of the seat 11, the third anchoring slots 114 and 115 of the two rail portions 110 being not used are moved to positions adjacent to the recessed portions 120 where they are obstructed at least by the sidewalls 122 of the base 12 (only one of the third anchoring slots 114 and 115 is illustrated in the obstructed state for avoiding redundancy). As a result, erroneous insertion and use of the safety belt 31 in the third anchoring slots 114 and 115 can be prevented when the child safety seat assembly 1 is used in the forward position.

It is worth noting that the sidewalls 122 can either obstruct entirely the third anchoring slots 114 and 115 (as shown in the embodiment of FIG. 6), or only partially the openings 1141 and 1151 of the third anchoring slots 114 and 115 (as shown in the embodiment of FIG. 8) for blocking insertion of the safety belt.

Figure 4:
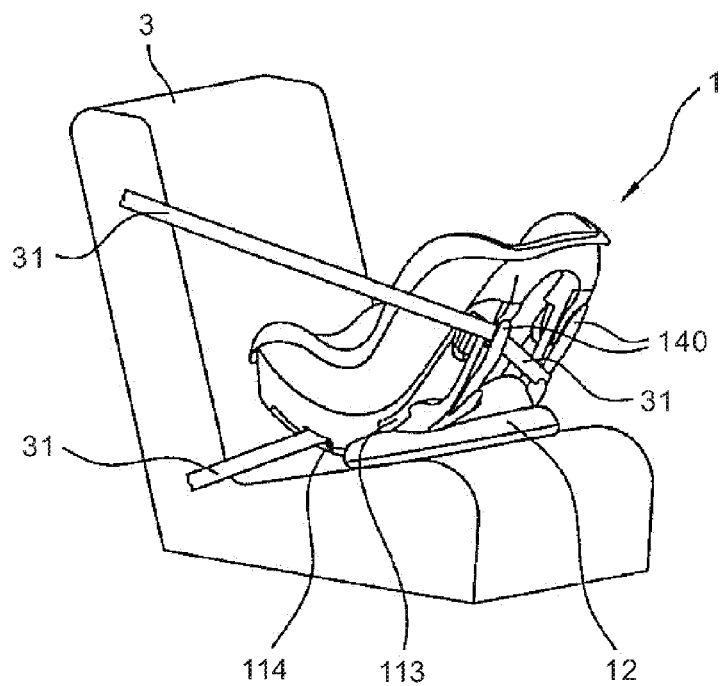
FIGS. 4 and 5 are schematic views illustrating the child safety seat assembly of FIG. 1 used on a vehicle seat in a rearward position.
Figure 5:
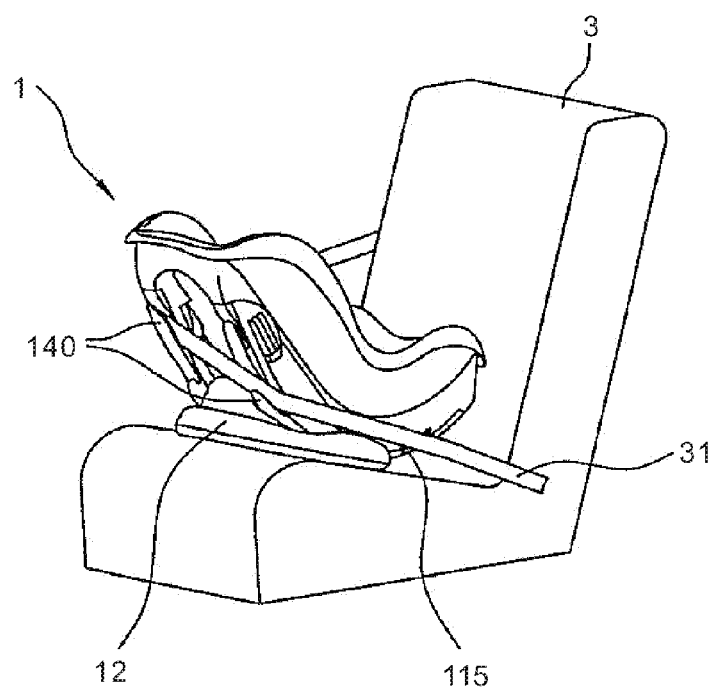

FIGS. 4 and 5 are schematic views illustrating one embodiment in which the child safety seat assembly 1 is used on a vehicle seat 3 in a rearward position (i.e., the front of the seat 11 is oriented toward the rear of the vehicle). In this configuration, the seat 11 is adjusted backward to a reclined position relative to the base 12, such that the third anchoring slots 114 and 115 are located outside the recessed portions 120, are uncovered by the sidewalls 122, and accessible from a front of the base 12. For securing the child safety seat assembly 1 on the vehicle seat 3, one portion of the safety belt 31 (e.g., lap strap) is inserted via the openings 1141 and 1151 from the bottom of the seat 11 into the exposed third anchoring slots 114 and 115. In this manner, the lap strap of the safety belt 31 can be retained in the third anchoring slots 114 and 115 of the two rail portions 110. Meanwhile, another portion of the safety belt 31 (e.g., shoulder strap) wraps around the rear of the backrest of the seat 11, and is retained in two anchoring pockets 140 at different heights in the rail portions 110. The shoulder strap can thereby extend along an oblique direction on the rear of the backrest. As better shown in FIG. 7, in this reclined position of the seat 11, the second anchoring slots 112 and 113 being not used are moved to positions adjacent to the recessed portions 120 where they can be obstructed by the sidewalls 121 of the base 12. As a result, erroneous insertion and use of the safety belt 31 in the second anchoring slots 112 and 113 can be prevented when the child safety seat assembly 1 is used in the rearward position.

At least one advantage of the seat assembly described herein is the ability to have the base selectively obstruct some anchoring slots of the seat that are not used when the seat is adjusted to a different position. As a result, erroneous operations for securing the seat assembly with a safety belt can be prevented, and the seat assembly can be safer in use.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat assembly comprising:
   a base including a plurality of protruding sidewalls; and
   a seat movably assembled with the base and including a plurality of anchoring slots adapted to retain a portion of a safety belt;
   wherein the seat is movably adjustable between an erected position and a reclined position relative to the base, and the seat is operable to cause the base to selectively obstruct at least one of the anchoring slots.

2. The child safety seat assembly according to claim 1, wherein the anchoring slots comprise:
- a first anchoring slot located at an upper side of a backrest of the seat;
- a second anchoring slot located at a lower side of the backrest; and
- a third anchoring slot located on a bottom of the seat.

3. The child safety seat assembly according to claim 2, wherein at least one of the sidewalls on the base obstructs the third anchoring slot when the seat is in the erected position relative to the base.

4. The child safety seat assembly according to claim 2, wherein at least one of the sidewalls on the base obstructs the second anchoring slot when the seat is in the reclined position relative to the base.

5. The child safety seat assembly according to claim 2, wherein a set of the first, second and third anchoring slots is respectively provided in each of two parallel rail portions provided on a rear of the backrest and a bottom of the seat, the rail portions having a curved profile and extending from the upper side of the backrest to the bottom of the seat.

6. The child safety seat assembly according to claim 5, wherein the two rail portions, including the first, second and third anchoring slots, are located at symmetrical positions on a left and right side of the backrest.

7. The child safety seat assembly according to claim 6, wherein the sidewalls on the base obstruct the third anchoring slot in each of the two rail portions when the seat is in the erected position relative to the base.

8. The child safety seat assembly according to claim 6, wherein the sidewalls on the base obstruct the second anchoring slot in each of the two rail portions when the seat is in the reclined position relative to the base.

9. The child safety seat assembly according to claim 6, wherein the sidewalls define two recessed portions adapted to respectively receive the rail portions therein, each recessed portion being delimited between two of the sidewalls.

10. The child safety seat assembly according to claim 9, wherein the rail portions are movable through the recessed portions when the seat is adjusted between the erected and reclined position relative to the base.

11. The child safety seat assembly according to claim 6, wherein the first, second and third anchoring slots respectively extend in a transversal direction from left to right through each of the rail portions.

12. A child safety seat assembly comprising:
- a base; and
- a seat movably assembled with the base, the seat having at least one anchoring slot adapted to retain a portion of a safety belt;
- wherein the seat is movably adjustable relative to the base between a first state in which the anchoring slot is obstructed to block passage of the safety belt through the anchoring slot, and a second state in which the anchoring slot is opened to allow passage of the safety belt through the anchoring slot.

13. The child safety seat assembly according to claim 12, wherein the anchoring slot is obstructed by the base in the first state.

14. The child safety seat assembly according to claim 12, wherein the anchoring slot is located at a bottom of the seat, and the base has at least one protruding sidewall that obstructs the anchoring slot when the seat is in the first state.

15. The child safety seat assembly according to claim 14, wherein the first state corresponds to an erected position of the seat relative to the base, and the second state corresponds to a reclined position of the seat relative to the base.

16. The child safety seat assembly according to claim 12, wherein the seat has a backrest, the anchoring slot is located at a lower side of the backrest, and the base has at least one protruding sidewall that obstructs the anchoring slot when the seat is in the first state.

17. The child safety seat assembly according to claim 16, wherein the first state corresponds to a reclined position of the seat relative to the base, and the second state corresponds to an erected position of the seat relative to the base.

18. A child safety seat assembly comprising:
- a base; and
- a seat assembled with the base, the seat having at least a first anchoring slot and a second anchoring slot spaced apart from each other and respectively adapted to retain a portion of a safety belt, and the seat being adjustable relative to the base between a first position and a second position;
- wherein each of the first and second anchoring slots alternates between an obstructed state where passage of the safety belt through the slot is blocked, and an opened state where passage of the safety belt through the slot is allowed, when the seat is adjusted between the first and second positions.

19. The child safety seat assembly according to claim 18, wherein the seat has a backrest, the first anchoring slot is located at a bottom of the seat, the second anchoring slot is located at a lower side of the backrest, and the base has one or more protruding wall configured to selectively obstruct the first and second anchoring slots.

20. The child safety seat assembly according to claim 19, wherein the base obstructs the first anchoring slot and leaves the second anchoring slot accessible for passage of the safety belt when the seat is in an erected position relative to the base, and the base leaves the first anchoring slot accessible for passage of the safety belt and obstructs the second anchoring slot when the seat is in a reclined position relative to the base.

* * * * *